United States Patent [19]
Hachisuka et al.

[11] Patent Number: 5,690,870
[45] Date of Patent: Nov. 25, 1997

[54] METHOD OF MANUFACTURING A POLYIMIDE-TYPE GAS PERMEATION MEMBRANE INCLUDING FLUORINE

[75] Inventors: Hisao Hachisuka, Osaka; Ping Xu, Kyoto; Tomomi Ohara, Osaka, all of Japan

[73] Assignee: Nitto Denko Corporation, Osaka, Japan

[21] Appl. No.: 544,202

[22] Filed: Oct. 17, 1995

[30] Foreign Application Priority Data

Oct. 26, 1994 [JP] Japan ................... 6-262783
Oct. 26, 1994 [JP] Japan ................... 6-262784

[51] Int. Cl.$^6$ ................ B29C 47/00; B29C 47/06; B29C 67/20; B29C 70/68
[52] U.S. Cl. ............ 264/41; 264/46.4; 264/129; 264/171.24; 427/245; 427/412.4
[58] Field of Search ............ 264/41, 46.4, 129, 264/171.24; 427/245, 412.4

[56] References Cited

U.S. PATENT DOCUMENTS

| | | | |
|---|---|---|---|
| 3,822,202 | 7/1974 | Hoehn | 95/55 |
| 3,959,350 | 5/1976 | Rogers | 528/185 |
| 4,705,540 | 11/1987 | Hayes | 95/51 |
| 4,717,393 | 1/1988 | Hayes | 95/51 |
| 4,838,900 | 6/1989 | Hayes | 95/54 |
| 4,929,405 | 5/1990 | Kohn | 264/41 |
| 4,932,982 | 6/1990 | Hayes | 95/51 |
| 4,981,497 | 1/1991 | Hayes | 95/51 |
| 5,067,970 | 11/1991 | Wang et al. | 95/51 |
| 5,165,963 | 11/1992 | Matsumoto et al. | 427/245 |
| 5,178,940 | 1/1993 | Matsumoto et al. | 428/304.4 |
| 5,246,743 | 9/1993 | Kusuki et al. | 427/569 |

FOREIGN PATENT DOCUMENTS

| | | |
|---|---|---|
| 59-225705 | 12/1984 | Japan . |
| 4-227831 | 8/1992 | Japan . |
| 5-7749 | 1/1993 | Japan . |
| 5-49882 | 3/1993 | Japan . |
| 5-146651 | 6/1993 | Japan . |
| 5-184887 | 7/1993 | Japan . |

*Primary Examiner*—Leo B. Tentoni
*Attorney, Agent, or Firm*—Merchant, Gould, Smith, Edell, Welter & Schmidt, P.A.

[57] ABSTRACT

Polyimide resin dope having at least three fluorine atoms in a repeating molecular unit and an organic solvent (A) are extruded in a tube form or coating the dope on a supporting body. The polyimide resin dope is then immersed in a solvent (B), which the organic solvent (A) is miscible with the solvent (B). Thus, a polyimide-type gas separation membrane including fluorine is virtually defect free in the skin layer, and manufactured cost-effectively by a simple manufacturing method.

16 Claims, No Drawings

METHOD OF MANUFACTURING A POLYIMIDE-TYPE GAS PERMEATION MEMBRANE INCLUDING FLUORINE

FIELD OF THE INVENTION

This invention relates to a method of manufacturing a polyimide-type gas permeation membrane including fluorine for separating gas. More specifically, this invention relates to a method of manufacturing the polyimide-type gas permeation membrane which is used as an asymmetrical membrane or a composite membrane for separating and condensing hydrogen, methane, carbon dioxide, water vapor, ions, or the like.

BACKGROUND OF THE INVENTION

Polyimide is a permeation membrane material with excellent heat-resisting and anti-chemical properties due to its high glass transition point and rigid molecular chain structure. Therefore, permeation membranes of various polyimides have been examined. For example, U.S. Pat. No. 4,378,400 and U.S. Pat. No. 4,959,151 disclose aromatic polyimide applying biphenyl tetracarboxylic dianhydride. Aromatic polyimide including fluorine is disclosed in Published Unexamined (Kokai) Japanese Patent Application No. Hei 5-7749, and U.S. Pat. Nos. 3,822,202, 3,899,309, 4,532,041, 4,645,824, 4,705,540, 4,717,393, 4,717,394, 4,838,900, 4,897,092, 4,932,882, 4,929,405, 4,981,497, and 5,042,992. Moreover, U.S. Pat. No. 4,964,887 and U.S. Pat. No. 4,988,371 disclose polyimides using aliphatic or alicyclic tetracarboxylic dianhydride.

For practical purposes, the thinning of a permeation membrane has been tested. The thickness of a polyimide-type homogeneous membrane including fluorine is controlled to less than 40 nm by a water facial expansion method in U.S. Pat. No. 4,929,405. However, the homogeneous membrane lacks mechanical strength with no supporting film. As a result, it is difficult to manufacture the membrane on an industrial scale and also to modularize the membrane.

Mechanical strength improves when a permeation membrane is asymmetrical. For example, aliphatic polyimide asymmetrical membranes are disclosed in U.S. Pat. Nos. 4,240,914, 4,358,378, 4,385,084, and 4,410,568. Moreover, aromatic polyimide or polyamic acid asymmetrical membranes are disclosed in U.S. Pat. Nos. 3,925,211, 4,113,628, 4,378,324, 4,440,643, 4,460,526, 4,474,662, 4,485,056, 4,512,893, 4,532,041 and 4,908,134, and Published Unexamined (Kokai) Japanese Patent Application No. Hei 4-227831. Aromatic polyimides including fluorine are disclosed in U.S. Pat. Nos. 4,705,540, 4,717,394, 5,085,676, and 5,178,940.

As a method of manufacturing a Loeb-type asymmetrical membrane, a wet-phase transversion method is applied. However, the method cannot manufacture asymmetrical membranes without forming pinholes. The asymmetrical membrane disclosed in U.S. Pat. No. 4,717,394 has high separation properties and permeability. However, since the membrane has no gas permeating supporting body, the mechanical strength of the membrane is weak. Thus, the membrane is not good for practical use, and is difficult to manufacture on an industrial level due to the required after-treatment with alcohol.

In order to form asymmetrical membranes with no pinholes, after-treatments (Published Unexamined Japanese Patent Applications No. Hei 5-049882 and No. Hei 5-146651), a pretreatment (Published Unexamined Japanese Patent Application No. Hei 5-184887), and improvements in the manufacturing processes of membranes (U.S. Pat. Nos. 4,902,422, 5,085,676 and 5,165,963) are disclosed. However, these methods have problems in that the manufacturing steps increase in number and become complex. In addition, the manufacturing cost increases, and it is difficult to manufacture stable membranes on an industrial level.

The above-mentioned conventional methods cannot produce practical polyimide permeation membranes on an industrial level. For instance, pinholes are formed during a film forming process, thus harming the properties of the permeation membranes. Even if the formation of pinholes is prevented, manufacturing processes become complex in the conventional methods, thereby increasing cost. It also becomes difficult to control manufacturing conditions when the generation of pinholes is lessened by restricting manufacturing conditions. Thus by using conventional methods, a membrane with stable separation properties and permeability cannot be manufactured.

SUMMARY OF THE INVENTION

It is an object of this invention to solve the above-mentioned conventional problems by providing a method of manufacturing a polyimide-type permeation membrane including fluorine, so that permeation membranes with high gas permeability are manufactured at low cost.

In order to accomplish these and other objects and advantages, a method of manufacturing a polyimide-type gas separation membrane comprising the steps of: extruding a polyimide dope which consists of a fluorine including polyimide resin and an organic solvent (A) in a tube form; or coating the dope on a supporting body; and immersing the fluorine including polyimide resin dope in a solvent (B). The polyimide resin includes at least three fluorine atoms in a repeating molecular unit. The organic solvent (A) incledes at least two ether bonds in a repeating molecular unit. The organic solvent (A) is miscible with the solvent (B). It is preferable that the solvent (B) does not dissolve the polyimide resin, but has compatibility with the organic solvent (A).

It is preferable that the polyimide resin includes at least one —$CF_3$ group in a repeating molecular unit.

It is also preferable that the polyimide resin including fluorine has a repeating molecular unit as a main component shown in the following Formula 1.

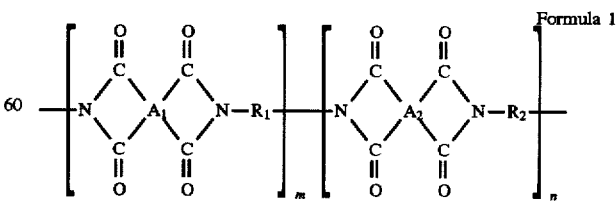

where $A_1$ and $A_2$ indicate tetravalent organic groups consisting of aromatic, alicyclic, or aliphatic hydrocarbon groups; $R_1$ and $R_2$ are divalent aromatic, alicyclic, aliphatic hydrocarbon groups, or divalent organic groups whereby the hydrocarbon groups are bonded by divalent organic bond groups; at least one organic group selected from the group consisting of $A_1$, $A_2$, $R_1$ and $R_2$ has at least three fluorine atoms; and $0 \leq m \leq 1$, $0 \leq n \leq 1$, and $m+n=1$.

It is preferable that the polyimide resin including fluorine has a repeating molecular unit as a main component shown in the following Formula 2.

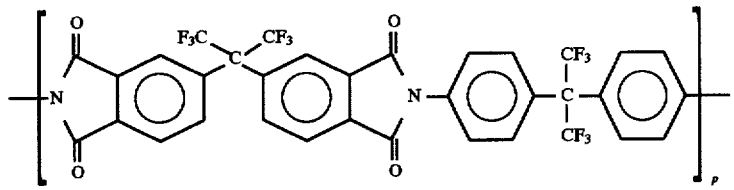

Formula 2 where p is an integer, preferably $50 \leq p \leq 500$.

It is also preferable that the organic solvent (A) is a mixed solvent of diethylene glycol dimethyl ether and diethylene glycol diethyl ether.

It is further preferable that the solvent (B) is water, alcohol of carbon number 1–10, and a mixture of water and the alcohol.

It is preferable that a thin film of elastomeric polymer is applied on the polyimide-type gas permeation membrane including fluorine.

It is also preferable that the thin film of elastomeric polymer is made of bridged cross-linking silicone resin.

Another method of manufacturing a polyimide-type gas separation membrane comprising the steps of: extruding a polyimide dope which consists of a fluorine including polyimide resin and an organic solvent (C) in a tube form; or coating the dope on a supporting body; and immersing the fluorine including polyimide resin dope in a solvent (B). The polyimide resin includes at least three fluorine atoms in a repeating molecular unit. The organic solvent (C) has a dielectric constant less than 30 and a dipole moment less than 3.0D. The organic solvent (C) is miscible with the solvent (B). It is preferable that the solvent (B) does not dissolve the polyimide resin, but has compatibility with the organic solvent (C).

It is preferable that the polyimide resin including fluorine includes at least one —$OF_3$ group in a repeating molecular unit.

It is also preferable that the polyimide resin including fluorine has a repeating molecular trait as a main component shown in the following Formula 3.

Formula 3 where $A_1$ and $A_2$ indicate tetravalent organic groups consisting of aromatic, alicyclic, or aliphatic hydrocarbon groups; $R_1$ and $R_2$ are divalent aromatic, alicyclic, aliphatic hydrocarbon groups, or divalent organic groups whereby the hydrocarbon groups are bonded by divalent organic bond groups; at least one organic group selected from the group consisting of $A_1$, $A_2$, $R_1$ and $R_2$ has at least three fluorine atoms; and $0 \leq m \leq 1$, $0 \leq n \leq 1$, and $m+n=1$.

It is preferable that the polyimide resin including fluorine has a repeating molecular unit as a main component shown in the following Formula 4.

Formula 4 where p is an integer, preferably $50 \leq p \leq 500$.

It is also preferable that the organic solvent (C) has a dielectric constant less than 10 and a dipole moment less than 3.0D.

It is further preferable that the solvent (B) is water, alcohol of carbon number 1–10, and a mixture of water and the alcohol.

It is preferable that a thin film of elastomeric polymer is applied on the polyimide-type gas permeation membrane including fluorine.

It is also preferable that the thin film of elastomeric polymer is made of bridged cross-linking silicone resin.

If the polyimide permeation membrane includes from six to 12 fluorine atoms in a repeating molecular unit, stable composite gas permeation membranes of high quality are provided. When the number of fluorine atoms in a repeating molecular unit exceeds 12, the material cost increases and practicality declines.

There is no limitation on the tetravalent organic group including at least three fluorine atoms as long as $A_1$ or $A_2$ has its proton of the tetravalent organic group replaced by a fluorine atom or a group including a fluorine atom. It is further preferable that at least one proton of the tetravalent organic group is replaced by a —CF$_3$ group. For example, it is preferable to apply a tetravalent organic group shown in the following Formula 5.

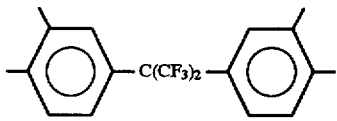

Formula 5

There is no limitation on the divalent organic group including at least three fluorine atoms as long as R$_1$ or R$_2$ has its proton of the divalent organic group replaced by a fluorine atom or a group including fluorine atoms. It is more preferable to use R$_1$ or R$_2$ with at least one proton of the divalent organic group replaced by a —CF$_3$ group. Specifically, divalent organic groups expressed as in the following Formulae 6, 7, 8, 9, 10 and 11 are preferably applied.

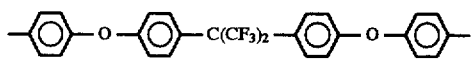

Formula 6

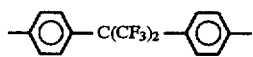

Formula 7

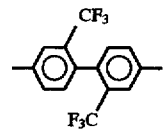

Formula 8

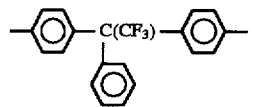

Formula 9

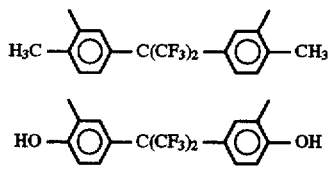

Formula 10

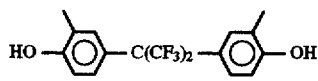

Formula 11

When the abundance ratio of amic acid to imide rings is less than 30% and the imide reaction ratio is 70% or more, no problems are encountered. The abundance ratio is calculated by quantifying the —COOH remaining to imide rings. With a 30% or higher abundance ratio, compatibility between organic solvent (A) and solvent (B) or between organic solvent (C) and solvent (B) increases due to the increase in —COOH, thus forming pinholes and reducing separation properties.

The polyimde resin including fluorine of the invention may be used alone, or can be mixed with at least one different kind of polyimide resin. Moreover, the polyimide resin including fluorine may be mixed with other polymers such as polysulfone and polyethersulfone as long as the mole % of the polymer is less than 50%, thus providing a copolymer or a mixed material.

In order to achieve this object, the polyimide-type gas separation membrane having virtually defect free in the skin layer of this invention is prepared by the comprising the steps of: extruding a polyimide dope which consists of a fluorine including polyimide resin and an organic solvent (A) in a tube form; or coating the dope on a supporting body; and immersing the fluorine including polyimide resin dope in a solvent (B); wherein the fluorine including polyimide resin comprises at least three fluorine atoms in a repeating molecular unit; wherein the organic solvent (A) comprises at least two ether bonds in a repeating molecular unit; and wherein the organic solvent (A) is miscible with the solvent (B).

It is preferable that the membrane be capable of separating and condensing at least one selected from hydrogen, methane, carbon dioxide, water vapor and ions.

The polyimide-type gas separation membrane having virtually defect free in the skin layer of this invention is prepared by the comprising the steps of: extruding a polyimide dope which consists of a fluorine including polyimide resin and an organic solvent (C) in a tube form; or coating the dope on a supporting body; and immersing the fluorine including polyimide resin dope in a solvent (B); wherein the fluorine including polyimide resin comprises at least three fluorine atoms in a repeating molecular unit; wherein the organic solvent (C) comprises at least two ether bonds in a repeating molecular unit; and wherein the organic solvent (C) is miscible with the solvent (B).

It is preferable that the membrane be capable of separating and condensing at least one selected from hydrogen, methane, carbon dioxide, water vapor and ions.

The polyimide resin including fluorine of the invention can be prepared with tetracarboxylic dianhydride and diamine by a conventional polymerization method (e.g. the polymerization method disclosed in U.S. Pat. No. 3,959, 350). For example, tetracarboxylic dianhydride and diamine are prepared at the same mole %, and are stirred and mixed in a polar solvent at less than 80° C., more preferably 0°–60° C., thus polymerizing polyamic acid. There is no particular limitation on the kinds of polar solvent. However, N-methyl pyrolidone, pyridine, dimethyl acetamide, dimethyl formamide, dimethyl sulfoxide, tetramethyl urea, phenol, and cresol can be preferably used.

When the organic solvent (A) is used as a polar solvent for polymerizing polyamic acid, the solvent can be kept as a solvent for doping and does not have to be replaced with another solvent for doping after the polymerization. As an organic solvent (A) having at least two ether bonds in a repeating molecular unit, 1,2-dimethoxyethane; 1,2-diethoxyethane; 1,2-dibutoxyethane; diethylene glycol dimethyl ether; diethylene glycol diethyl ether; diethylene glycol dimethyl ether; diethylene glycol diethyl ether; diethylene glycol dibutyl ether; triethylene glycol dimethyl ether; or the like is applied. The solvent maybe applied alone, or mixed with other solvents.

In the polyamic acid solution, a tertiary amine compound such as trimethyl amine, triethyl amine and pyridine, an acid anhydride such as acetic anhydride, thionyl chloride, carbodiimide, or the like is added as an imide reacting agent. The solution is then mixed and stirred at 5°–150° C., thus providing a 70% or higher imide reaction ratio. During the imide reaction, the imide reacting agent need not be added, and instead the polyamic acid solution may be heated at 100°–400° C., or more preferably 120°–300° C.

Polyimide, Which was purified by being dropped in a large quantity of acetone, alcohol or water so as to remove the polar solvent or imide reacting agent after the imide reaction, is dissolved again in an organic solvent (A) having at least two ether bonds in a molecular unit and is used as a dope. In other words, when the organic solvent (A) is applied as a polarizer, it is unnecessary to remove the imide reacting agent and the agent is used as a dope.

Or alternately, the polyimide maybe dissolved again in an organic solvent (C) having a dielectric constant less than 30 and a dipole moment less than a 3.0D, and is used as a dope for manufacturing membranes.

When the imide reaction is carried out without an imide reacting agent, polyamic acid powder or polyamic acid solid which is prepared by drying solvent from a polyamic acid solution (polyamic acid powder maybe prepared by adding a precipitant during the evaporation) is heated at 100°–400° C. and is dissolved in the organic solvent (A) or the organic solvent (C) as a dope for manufacturing membranes.

The density of the polyimide solution dissolved in the organic solvent (A) having at least two ether bonds in a repeating molecular unit is 3–40% by weight, or more preferably 10–30% by weight. If necessary, a swelling agent, a dispersing agent, or a thickener may be added.

Diethylene glycol dimethyl ether or diethylene glycol diethyl ether is preferably used as the organic solvent (A). A mixed solvent of diethylene glycol dimethyl ether and diethylene glycol diethyl ether in a weight ratio of from 90:10–10:90 is most preferable.

In order to adjust the solubility of polyimide including fluorine or the viscosity of dope, an aprotic solvent such as N-methyl-2-pyrolidone (NMP) and N-N-dimethyl acetamide may be added. The aprotic solvent is chosen, depending on applied solvents, but is used at less than 40% by weight.

The density of the polyimide solution dissolved in the organic solvent (C) having a dielectric constant less than 30 and a dipole moment less than 3.0D is preferably 3–40% by weight, or more preferably 10–30% by weight. If required, a swelling agent, a dispersing agent, or a thickener may also be added.

The organic solvent (C) of the invention has a dielectric constant less than 30 and a dipole moment less than 3.0D; the dielectric constant is preferably less than 10.

Since the polarity of the organic solvent (C) is weak, the solvent has weak compatibility with the solvent (B) applied as a solidifying solution. Thus, since the speed of forming a skin layer during the wet-type phase transversion manufacturing processes is shorter than the speed of the doping solvent leaching to a solidifying solution, pinholes are not formed even in the skin layer and the membranes can be manufactured on an industrial scale.

When the dipole moment is expressed as $\mu$ (vector) and electric charge (or magnetic charge) $q_1, q_2, \ldots q_n$ (scalar) is in $r_1, r_2 \ldots r_n$ (vector), $\mu = \Sigma q_i \times r_i$.

If electric flux density d (vector) is determined with $\epsilon$ (scalar) dielectric constant and macroscopic electric field E (vector) inside a material, the dielectric constant is expressed as $d = \epsilon E$.

As long as the above-mentioned conditions are satisfied, there is no limitation on the organic solvent (C). However, diethylene glycol dimethyl ether (5.97 dielectric constant and 1.97D dipole moment) is preferable. 1,2-dimethoxyethane (5.50 dielectric constant and 1.79D dipole moment) can also be applied. The organic solvent may be used alone, or can be mixed with other solvents.

In order to adjust the solubility of polyimide including fluorine and the viscosity of dope, an aprotic solvent with a dielectric constant greater than 30 and/or a dipole moment above 3.0D can be applied as long as the weight % of the aprotic solvent does not exceed thirty. The amount of the aprotic solvent in the organic solvent (C) depends on the kind of solvents. A preferable organic solvent (C) includes 60–100% by weight of diethylene glycol dimethyl ether. For example, a mixed solution of 67% by weight of diethylene glycol dimethyl ether and 33% by weight of N-methyl pyrolidone (NMP) can be used.

Film shapes of gas permeation membranes of the invention are not particularly limited. However, by dipping the dope of organic solvent (A) or (C) in a solidifying solutuion (solvent (B)) by an extrusion method, a flow cast method, or the like, an asymmetrical membrane in a tube form (including a hollow yarn form), a flat asymmetrical membrane, or the like is provided.

Dope is coated on a gas permeating supporting body by a casting or dipping method, and the body is dipped in a solidifying solution (solvent (B)), thus forming a flat asymmetrical membrane. The mechanical strength improves when the asymmetrical membrane has a composite structure. As the supporting body, a glass plate with a flat surface or a gas permeating supporting body can be used. As the gas permeating supporting body, a porous organic, inorganic or metallic body with a flat and smooth surface, a woven cloth with a flat and smooth surface, or an unwoven cloth with a flat and smooth surface maybe used. The dope is coated on the gas permeating supporting body at 25–400 μm thickness, or more preferably 30–200 μm.

The dope is formed at −30° to 80° C., or more preferably at −20° to 40° C.

As long as the solidifying solution (solvent (B)) does not dissolve polyimide resin including fluorine and is compatible with organic solvent (A) or organic solvent (C), there is no particular limitation on the solvent (B). However, water, alcohol such as methanol, ethanol and isopropyl alcohol, or a mixed solution of water and alcohol is used as the solvent (B). Particularly, water is preferable. The temperature of the solidifying solution (solvent (B)) during the processes of dipping and removing the organic solvent (A) or organic solvent (C) is not particularly limited, but preferably from 0° C. to 50° C.

As a result, a gas permeation membrane having no pinholes and with a skin layer of about 100 nm thickness is manufactured over a wide range by forming an asymmetrical membrane in the above-mentioned conditions.

It is preferable that elastomer polymer is coated on the surface of the polyimide membrane including fluorine. The elastomer polymer film can cover the defects on the gas permeation membrane and prevent the membrane from being scratched. A polymer which has flexible film forming properties is applied as the elastomer polymer. Specifically, the polymer includes ethylene monomer or the homopolymer or copolymer of conjugated diene system monomers such as polypropylene, polyvinylchloride, ethylene-propylene copolymer, ethylene-propylene-diene copolymer, polybutadiene, polyisoprene, chloroprene rubber, poly(4-methyl -pentene-1), butadiene-sutylene copolymer, isoprene-isobutylene copolymer and polyisobutylene; copolymer having a monomer with functional groups in addition to the above-noted monomer such as acrylonitrile, (metha)acrylic ester and (metha)acrylic acid; and a copolymer having a soft segment and a hard segment such as polyether polyol, polyurethane polyether, polyurethane polyester and polyamide polyether. In addition, epoxy resin which is cured by a straight and long chain curing agent, ethyl cellulose, or butoxy resin is also used as the elastomer copolymer.

As the elastomer copolymer, a cross-linking silicone resin is most preferable. The cross-linking silicone resin is soluble in an organic solvent before it is cross-linked. The method of manufacturing a membrane with the cross-linking silicone resin is disclosed in Published Unexamined Japanese Patent Application No. Sho 59-225705.

Furthermore, the polyimide resin including fluorine is highly soluble in the organic solvent (A), and has weak comparability with a solvent (solidifying liquid) due to ether bonds. Therefore, the speed of leaching the organic solvent to the solidifying liquid is significantly less than the speed of forming a skin layer during a wet-type phase transversion manufacturing processes, so that no pinholes are formed in the skin layer over a wide range, and thus membranes can be manufactured on an industrial scale.

Moreover, the polyimide resin including fluorine is highly soluble in the organic solvent (C), and has weak compatibility with a solvent (solidifying liquid) since the solvent has less than a 30 dielectric constant and less than a 3.0D dipole moment. The speed of leaching the organic solvent to the solidifying liquid is significantly less than the speed of forming a skin layer during a wet-type phase transversion manufacturing processes. Thus, virtually no pinholes are formed in the skin layer over a wide range and membranes can be manufactured on an industrial scale.

DETAILED DESCRIPTION OF THE INVENTION

This invention will be described by referring to the following illustrative examples.

Example 1

Polyimide including fluorine and having a repeating molecular unit shown in Formula 12 was prepared in the following method.

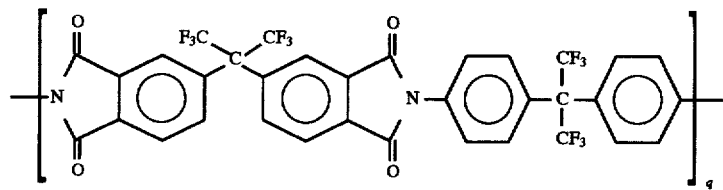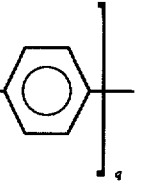

Formula 12 wherein q is 435, which is the value calculated based on weight-average molecular weight.

Polyamic acid was prepared by adding 10.3 parts of 5,5'-2,2,2-trifluoro-1-(trifluoromethyl)ethylidene-bis-1,3-isobenzofurandion (6FDA) in a solution, in which 7.7 parts of 2,2-bis(4-amonophenyl)hexafluoropropane (BAAF) was dissolved in 56.9 parts of diethylene glycol dimethyl ether (DEGDME) in a nitrogen atmosphere, was stirred at room temperature for eight hours, and was then synthesized.

12.6 wt. parts of diethylene glycol diethyl ether (DEGEE) were added to the polyamic acid. After the solution was mixed evenly, 5.5 wt. parts of pyridine (imide reaction accelerator) and 7.0 wt. parts of acetic anhydride were added to the solution and were stirred at room temperature for twelve hours, thus generating an imide reaction. After the reaction, there was no need to purify the solution. The solution was filtered as a dope, and was set still to eliminate bubbles. The dope at 0° C. was cast on a polyester unwoven cloth at 130 μm thickness, and was dipped in water (solvent (B) and solidifying solution) at 47° C. for one hour. An asymmetrical gas permeation membrane was formed after being dried with warm air at 60° C. The permeability of the gas permeation membrane was evaluated, and the results are shown in the following Table 1-3.

Example 2

The experiment was the same as in Example 1, except that 17.4 wt. parts were used, instead of 12.6 wt. parts, of DEGDEE. As a result, the number of parts of polyimide having a repeating molecular unit shown in Formula 12 decreased from 18 wt. parts of Example 1 to 17 wt. parts. The results are shown in Table 1-3.

Example 3

The experiment was the same as in Example 1, except that a mixed solvent of DEGDME and DEGDEE (34.7 parts and 22.2 parts), instead of 56.9 parts of DEGDME, was used. The results are shown in Table 1-3.

Example 4

On the surface of the gas permeation membrane which was formed in Example 1 and not yet dried, a cross-linking silicone resin solution (elastomeric solution; solution including 3% by weight of RTV615 hexane manufactured by GE Silicones Co., Ltd.) was coated, and was treated with heat at 110° C. for five minutes. Thus, an elastomeric polymer thin film was laminated. The permeability of the gas permeation membrane was evaluated, and the results are shown in Table 1-3.

Example 5

On the surface of the gas permeation membrane which was formed in Example 2 and not yet dried, a cross-linking silicone resin solution (elastomeric solution; solution including 3% by weight of RTV615 hexane manufactured by GE Silicones Co., Ltd.) was coated, and was treated with heat at 110° C. for five minutes. Thus, an elastomeric polymer thin film was laminated. The permeability of the gas permeation membrane was evaluated, and the results are shown in Table 1-3.

Example 6

On the surface of the gas permeation membrane which was formed in Example 3 and not yet dried, a cross-linking silicone resin solution (elastomeric solution; solution including 3% by weight of RTV615 hexane manufactured by GE Silicones Co., Ltd.) was coated, and was treated with heat at 110° C. for five minutes. Thus, an elastomeric polymer thin film was laminated. The permeability of the gas permeation membrane was evaluated, and the results are shown in Table 1-3.

Comparative Example 1

10.3 wt. parts of 6FDA were added to a solution, in which 7.7 wt. parts of BAAF were dissolved in 56.9 wt. parts of DEGDME in a nitrogen atmosphere, and were then stirred at room temperature for eight hours. Then, 12.6 wt. parts of DEGDME were added to the solution. After the solution was mixed evenly, 5.5 wt. parts of pyridine and 7.0 wt. parts of acetic anhydride were added as imide reaction accelerators, and were stirred at room temperature for twelve hours, thus generating an imide reaction. After the reaction, there was no need to purify the solution. The solution was filtered as a dope solution, and was set still to eliminate bubbles. The dope solution at 0° C. was cast on a polyester unwoven cloth at 130 μm thickness by an applicator. The cloth was then dipped in water (solidifying solution or solvent (B)) at 47° C. for one hour. An asymmetrical gas permeation membrane was provided after being dried with warm air at 60° C. The permeability of the gas permeation membrane was evaluated, and the results are shown in Table 1–3.

Comparative Example 2

A cross-linking silicone resin solution (elastomeric polymer; a solution including 3% by weight of RTV615 hexane manufactured by GE Silicones Co., Ltd.) was coated on the surface of the gas permeation membrane which was prepared in Comparative Example 1 and not yet dried. The resin solution was then treated with heat at 110° C. for five minutes, thus laminating an elastomeric thin film. The permeability of the gas permeation membrane was evaluated, and the results are shown in Table 1–3.

A mixed solution of diethylene glycol dimethyl ether or diethylene glycol dimethyl ether was applied as an organic solvent (C) in the following examples. The dielectric constant of diethylene glycol dimethyl ether was 5.97 while the dipole moment was 1.97D.

TABLE 1

| (Formula) | Polyimide Resin Including Fluorine | Organic Solvent(A) + α* | |
|---|---|---|---|
| | Number of wt. parts | Organic Solvent(A)* | |
| | | DEGDME*² | DEGDME*³ |
| Example 1 (Chemical Formula 12) | 18 Parts | 56.9 | 12.6 |
| Example 2 (Chemical Formula 12) | 18 Parts | 53.7 | 17.4 |
| Example 3 (Chemical Formula 12) | 18 Parts | 34.7 | 4.8 |
| Example 4 (Chemical Formula 12) | 18 Parts | 56.9 | 2.6 |
| Example 5 (Chemical Formula 12) | 18 Parts | 53.7 | 7.4 |
| Example 6 (Chemical Formula 12) | 18 Parts | 34.7 | 4.8 |
| (1) (Chemical Formula 12) | 18 Parts | 69.5 | — |
| (2) (Chemical Formula 12) | 18 Parts | 69.5 | — |

TABLE 2

| | Organic Solvent (A) + α*¹ | Solvent (B) Solidifying Solution | | Dehydrating Treatment and |
|---|---|---|---|---|
| | Temp. (°C.) | (a) | (b) | Solvent Replacement |
| Example 1 | 0 | water | 47 | (c) |
| Example 2 | 0 | water | 47 | (c) |

TABLE 2-continued

| | Organic Solvent (A) + α*¹ | Solvent (B) Solidifying Solution | | Dehydrating Treatment and |
|---|---|---|---|---|
| | Temp. (°C.) | (a) | (b) | Solvent Replacement |
| Example 3 | 0 | water | 47 | (c) |
| Example 4 | 0 | water | 47 | (c) |
| Example 5 | 0 | water | 47 | (c) |
| Example 6 | 0 | water | 47 | (c) |
| (1) | 0 | water | 47 | (c) |
| (2) | 0 | water | 47 | (c) |

TABLE 3

| | | Permeability of Gas Permeation Membrane | |
|---|---|---|---|
| | Elastomeric Thin Film | $CO_2$ Permeating Speed $(Nm^3/m^2/h/atm)$ | $CO_2/CH_4$ Separation Factor |
| Example 1 | None | 2.70 | 15.6 |
| Example 2 | None | 3.80 | 15.9 |
| Example 3 | None | 1.51 | 24.1 |
| Example 4 | (3) | 1.30 | 40.2 |
| Example 5 | (3) | 1.60 | 45.2 |
| Example 6 | (3) | 0.80 | 44.0 |
| (1) | None | 4.30 | 8.2 |
| (2) | (3) | 2.30 | 24.0 |

(Table 1–3)
*Number of Parts
(a) Solvent (B)
(b) Dipping Temperature (°C.)
(c) Dried with Warm Air at 60° C.
(1) Comparative Example 1
(2) Comparative Example 2
(3) cross-linking silicone, 110° C., five minutes
α*¹: When an imide reacting agent is used, it is indicated as "Included" (pyridine: 5.5 wt. parts, acetic anhydride: 7.0 wt. parts; only in Examples 2 and 5, pyridine: 5.5 wt. parts, acetic
DEGDME*²: diethylene glycol dimethyl ether
DEGDEE*³: diethylene glycol diethyl ether Example 7

Polyimide including fluorine and having a repeating molecular unit shown in Chemical Formula 12 was prepared by the following method.

Polyamic acid was prepared by reacting 0.1 mol of 5,5'-2,2,2-trifluoro-1-(trifluoromethyl)ethylidene-bis-1,3-isobenzofurandion (6FDA) and 0.1 mol of 2,2-bis(4-aminophenyl)hexafluoropropane (BAAF) in N-methyl-2-pyrolidone (NMP) solution for four hours. An imide reaction was carried out for fifteen hours by adding 0.3 mol of pyridine and 0.3 mol of acetic anhydride. After the reaction, the solution was diluted by adding NMP, thus preparing an NMP solution. The solution was purified after dropping the NMP solution in a large quantity of water. As a result, polyimide including fluorine and having a repeating molecular unit shown in Chemical Formula 12 was prepared. The glass transition point of the polyimide was 301° C. while the weight average molecular weight was 159,000.

18 weight parts of polyimide including fluorine and having a repeating molecular unit shown in Chemical Formula 12 was diluted, and 82 weight parts of diethylene glycol dimethyl ether was added as an organic solvent (C). The polyimide was stirred at 100° C. for six hours, and was then filtered. The polyimide was set still to eliminate bubbles, thus preparing a dope. The dope was cast on a polyester unwoven cloth at 20 cm width and 300 μm thickness by an applicator. The cloth was then dipped in water (solidifying solution or solvent (B)) at 5° C. for one hour. The cloth was then washed with water, and was dried with air at room temperature. As a result, an asymmetrical gas permeation membrane was formed. The permeability of the membrane was evaluated, and the results are shown in the following Table 4–6.

Example 8

The experiment was the same as in Example 6, except that the temperature of water (solidifying solution and solvent (B)) was 20° C. and the dehydration and solvent replacement treatments were carried out with ethanol and hexane for one hour after being washed with water. The permeability of the gas permeation membrane was evaluated, and the results are shown in Table 4–6.

Example 9

The experiment was the same as in Example 7, except that the solvent (B) was methanol at 22° C. and the dehydration and solvent replacement treatments were carried out with ethanol and hexane for one hour after being washed with water. The permeability of the gas permeation membrane was evaluated, and the results are shown in Table 4–6.

Example 10

A mixed solution of 74 weight parts of diethylene glycol dimethyl ether and 10 weight parts of NMP was added to 16 weight parts of polyimide including fluorine and having a repeating molecular unit shown in Chemical Formula 12, and was dissolved. Then, the solution was filtered, and was set still to eliminate bubbles, thus preparing a dope. The dope was cast on a polyester unwoven cloth by an applicator at 20 cm width and 300 μm thickness, and the cloth was then dipped in water (solidifying solution and solvent (B)) at 22° C. The experiment was the same as in Example 7, except that the dehydration and solvent replacement treatments were carried out with ethanol and hexane for one hour. The permeability of the gas permeation membrane was evaluated, and the results are shown in Table 4–6.

Example 11

A cross-linking silicone resin solution (elastomeric polymer; solution including 3% by weight of RTV615 hexane manufactured by GE Silicones Co., Ltd.) was coated on the gas permeation membrane formed in Example 10, and was then treated with heat at 110° C. for thirty minutes. Thus, an elastomeric polymer thin film was laminated. The permeability of the gas permeation membrane was evaluated, and the results are shown in Table 4–6.

Example 12

The experiment was the same as in Example 11, except that 10% ethanol solution at 22° C. was applied as solvent (B). The permeability of the gas permeation membrane was evaluated, and the results are shown in Table 4–6.

Example 13

A mixed solution of 64 weight parts of diethylene glycol dimethyl ether and 20 weight parts of NMP was added to 16 weight part of polyimide including fluorine and having a repeating molecular unit shown in Chemical Formula 12 mentioned above. Then, the solution was filtered, and set still to remove bubbles completely, thus preparing a dope. The dope was cast on a polyester unwoven cloth by an applicator at 20 cm width and 300 μm thickness. The cloth was dipped in water (solidifying solution and solvent (B)) at 22% for one hour. After the dehydration and solvent replacement treatments with ethanol and hexane were carried out for one hour, the cloth was dried with air, thus forming an asymmetrical gas permeation membrane. A cross-linking silicone resin solution (elastomeric polymer; solution including 3% by weight of RTV615 hexane manufactured by GE Silicones Co., Ltd.) was coated on the gas permeation membrane, and was treated with heat at 110° C. for fifteen minutes. Thus, an elstomeric polymer thin film was laminated. The permeability of the gas permeation membrane was evaluated, and the results are shown in Table 4–6.

Example 14

An organic solvent (C) was prepared by mixing 8 weight parts of polyimide including fluorine and having a repeating molecular unit shown in the Formula 12 with 10 weight parts of polyimide including fluorine and having a repeating molecular unit shown in Formula 13.

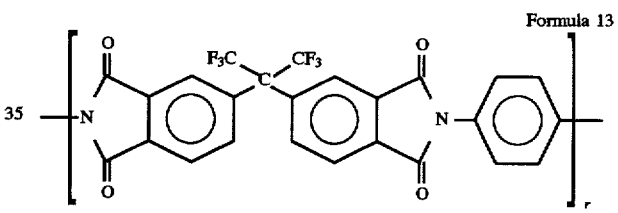

Formula 13 wherein r is 310, which is the value calculated based on weight-average molecular weight.

A mixed solution of 55 weight parts of diethylene glycol dimethyl ether and 27 weight parts of NMP was added to the organic solvent (C), and was dissolved. The solution was then filtered, and was set still to remove bubbles completely, thus preparing a dope. The dope was cast on a polyester unwoven cloth by an applicator at 20 cm width and 300 μm thickness. The cloth was then dipped in water (solidifying solution and solvent (B)) at 5° C. for one hour, and was washed with water. An asymmetrical gas permeation membrane was formed after the cloth was dried with hot air at 130° C. The permeability of the gas permeation membrane was evaluated, and the results are shown in Table 4–6.

Comparative Example 3

This experiment was the same as in Example 7, except that NMP, instead of diethylene glycol dimethyl ether, was applied as the organic solvent (C). The permeability of the gas permeation membrane was evaluated, and the results are shown in Table 4–6. The separation factor ($\alpha$) of carbon dioxide/methane gas of the gas permeation membrane was 0.6 and low, and pinholes were found in a skin layer.

TABLE 4

Polyimide Resin Including Fluorine

| | (Formula) | Number of wt. parts | Organic Solvent (A) Organic Solvent (A) |
|---|---|---|---|
| Example 7 | (Chemical Formula 12) | 18 Parts | DEGDME 82 Parts |
| Example 8 | (Chemical Formula 12) | 18 Parts | DEGDME 82 Parts |
| Example 9 | (Chemical Formula 12) | 18 Parts | DEGDME 82 Parts |
| Example 10 | (Chemical Formula 12) | 18 Parts | (2) |
| Example 11 | (Chemical Formula 12) | 18 Parts | (2) |
| Example 12 | (Chemical Formula 12) | 18 Parts | (2) |
| Example 13 | (Chemical Formula 12) | 18 Parts | (3) |
| Example 14 | (Chemical Formula 12) and (Formula 13) | 8 Parts 10 Parts | (4) |
| (1) | (Chemical Formula 12) | 18 Parts | NMP 82 Parts |

TABLE 5

| | Organic Solvent (A) Temp. (°C.) | Solvent (B) Solidifying Solution (a) | (b) | Dehydrating Treatment and Solvent Replacement |
|---|---|---|---|---|
| Example 7 | Room Temperature | water | 5 | (c) |
| Example 8 | Room Temperature | water | 20 | (d) |
| Example 9 | Room Temperature | methanol | 22 | (d) |
| Example 10 | Room Temperature | water | 22 | (d) |
| Example 11 | Room Temperature | water | 22 | (d) |
| Example 12 | Room Temperature | methanol* | 22 | (d) |
| Example 13 | Room Temperature | water | 22 | (c) |
| Example 14 | Room Temperature | water | 5 | (e) |
| (1) | Room Temperature | water | 5 | (c) |

* 10%

TABLE 6

Permeability of Gas Permeation Membrane

| | Elastomeric Thin Film | $CO_2$ Permeating Speed ($Nm^3/m^2/h/atm$) | $CO_2/CH_4$ Separation Factor |
|---|---|---|---|
| Example 7 | None | 0.98 | 47 |
| Example 8 | None | 2.02 | 43 |
| Example 9 | None | 7.66 | 10 |
| Example 10 | None | 3.28 | 36 |
| Example 11 | (f) | 2.65 | 40 |
| Example 12 | (f) | 5.75 | 21 |
| Example 13 | (f) | 9.84 | 12 |
| Example 14 | None | 1.25 | 52 |
| (1) | None | 62.0 | 0.6 |

(Table 4–6)
(a) Solvent (B)
(b) Dipping Temperature (°C.)
(c) Dried with Air at Room Temperature
(d) ethanol and hexane
(e) dried with hot air at 130° C.
(f) cross-linking silicone, 110° C., 30 minutes
(1) Comparative Example 3
(2) DEGDME (74 parts) and NMP (10 parts)
(3) DEGDME (64 parts) and NMP (20 parts)
(4) DEGDME (55 parts (67 wt. %) and NMP (27 parts (33 wt. %))
DEGDME: diethylene glycol dimethyl ether
NMP: N-methyl-2-pyrolidone

Example 15

The permeability of the gas permeation membrane formed in Example 8 was tested with various gases, and the results are shown in the following Table 7.

TABLE 7

Permeability of Gas Permeation Membrane ($Nm^3/m^2/h/atm$)

| Permeating Gas | Permeating Speed |
|---|---|
| $CO_2$ | 2.02 |
| $H_2$ | 4.10 |
| $O_2$ | 0.47 |
| $N_2$ | 0.08 |

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A method of manufacturing a fluorine including polyimide-type gas separation membrane comprising the steps of:

extruding a polyimide dope which consists of a fluorine including polyimide resin and an organic solvent (A) in a tube form; or coating said dope on a supporting body; and immersing the extruded tube or the coated supporting body in a solvent (B) to form a membrane; wherein said fluorine including polyimide resin comprises at least three fluorine atoms in a repeating molecular unit; wherein said organic solvent (A) comprises at least two ether bonds in a repeating molecular unit; and wherein said organic solvent (A) is miscible with said solvent (B).

2. The method of claim 1, wherein the polyimide resin including fluorine comprises at least one —$CF_3$ group in a repeating molecular unit.

3. The method of claim 1, wherein the polyimide resin including fluorine comprises a repeating molecular unit as a main component shown in Formula 1;

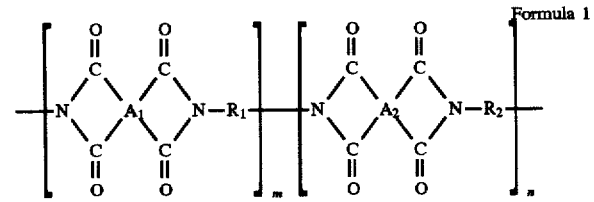

where $A_1$ and $A_2$ are tetravalent organic groups consisting of aromatic, alicyclic, or aliphatic hydrocarbon groups; $R_1$ and $R_2$ are divalent aromatic, alicyclic, aliphatic hydrocarbon groups, or divalent organic groups whereby said hydrocarbon groups are bonded by divalent organic bond groups; at least one organic group selected from the group consisting of $A_1$, $A_2$, $R_1$ and $R_2$ comprises at least three fluorine atoms; and $0 \leq m \leq 1$, $0 \leq n \leq 1$, and $m+n=1$.

4. The method of claim 1, wherein the polyimide resin including fluorine comprises a repeating molecular unit as a main component shown in Formula 2;

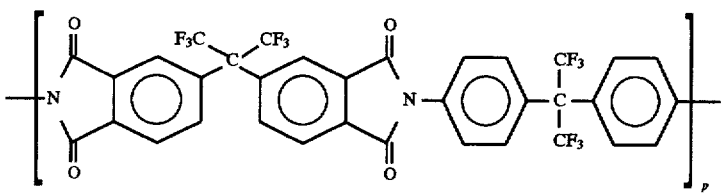

Formula 2 where p is an integer.

5. The method of claim 1, wherein the organic solvent (A) is a mixed solvent of diethylene glycol dimethyl ether and diethylene glycol diethyl ether.

6. The method of claim 1, wherein the solvent (B) is at least one material selected from the group consisting of water, alcohol of carbon number 1–10, and a mixture of water and said alcohol.

7. The method of claim 1, further comprising forming a thin film of elastomeric polymer on the surface of the polyimide-type gas permeation membrane including fluorine.

8. The method of claim 7, wherein the thin film of elastomeric polymer is a bridged cross-linking silicone resin.

9. A method of manufacturing a fluorine including polyimide-type gas separation membrane comprising the steps of:

extruding a polyimide dope which consists of a fluorine including polyimide resin and an organic solvent (C) in a tube form; or coating said dope on a supporting body; and immersing the extruded tube or the coated supporting body in a solvent (B) to form a membrane; wherein said fluorine including polyimide resin comprises at least three fluorine atoms in a repeating molecular unit; wherein said organic solvent (C) has a dielectric constant less than 30 and a dipole moment less than 3.0D; and wherein said organic solvent (C) is miscible with said solvent (B).

10. The method of claim 9, wherein the polyimide resin including fluorine comprises at least one —$CF_3$ group in a repeating molecular unit.

11. The method of claim 9, wherein the polyimide resin including fluorine comprises a repeating molecular unit as a main component shown in Formula 3;

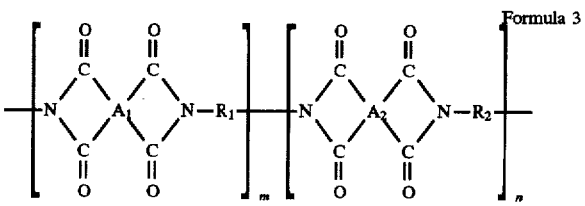

Formula 3 where $A_1$ and $A_2$ are tetravalent organic groups consisting of aromatic, alicyclic, or aliphatic hydrocarbon groups; $R_1$ and $R_2$ are divalent aromatic, alicyclic, aliphatic hydrocarbon groups, or divalent organic groups whereby said hydrocarbon groups are bonded by divalent organic bond groups; at least one organic group selected from the group consisting of $A_1$, $A_2$, $R_1$ and $R_2$ comprises at least three fluorine atoms; and $0 \leq m \leq 1$, $0 \leq n \leq 1$, and $m+n=1$.

12. The method of claim 9, where the polyimide resin including fluorine comprises a repeating molecular unit as a main component shown in Formula 4;

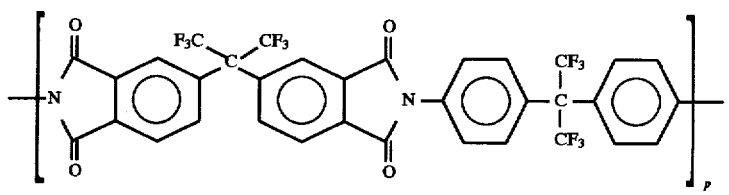

Formula 4 where p is an integer.

13. The method of claim 9, wherein the organic solvent (C) has a dielectric constant less than 10 and a dipole moment less than 3.0D.

14. The method of claim 9, wherein the solvent (B) is at least one material selected from the group consisting of water, alcohol, and a mixture of water and alcohol.

15. The method of claim 9, further comprising forming a thin film of elastomeric polymer on the surface of the polyimide-type gas permeation membrane including fluorine.

16. The method of claim 15, wherein the thin film of elastomeric polymer comprises bridged cross-linking silicone resin.

* * * * *